C. A. Harper.
Water Boiler.
No. 2806
Reissued Nov. 26 1867.
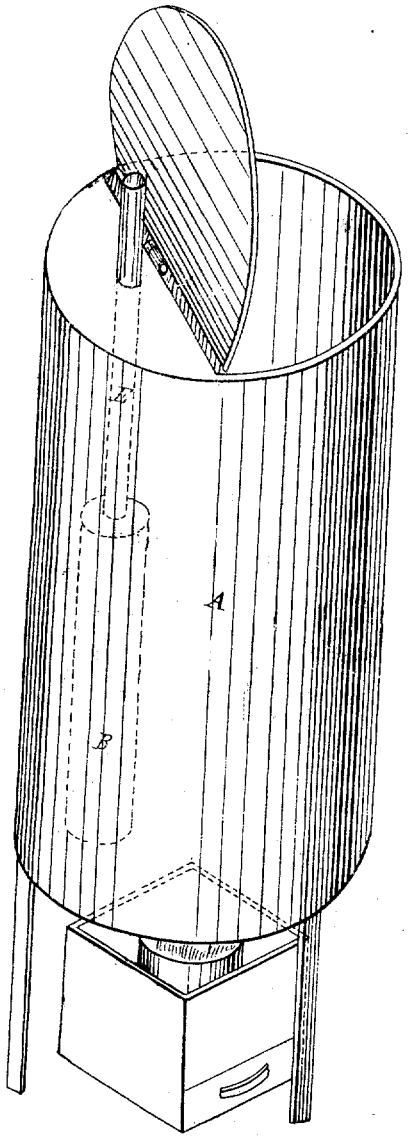
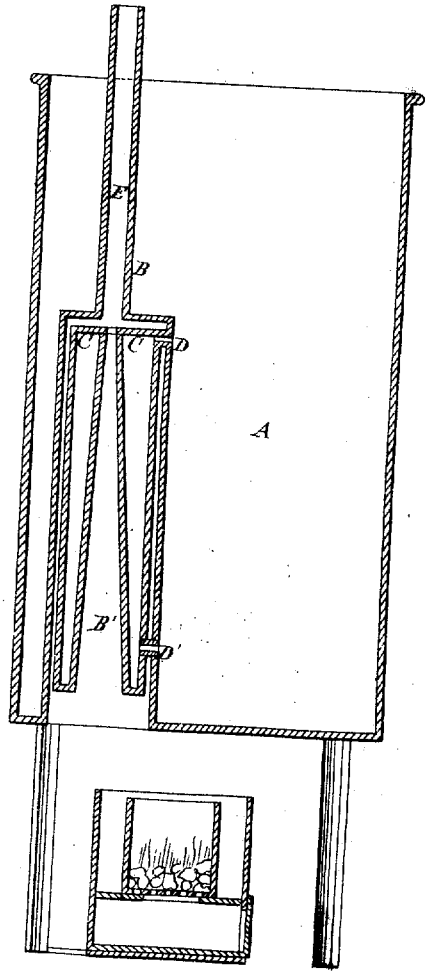
Witnesses.
Chas. F. Blanchard
Lawrence Mc
Inventor.
C. A. Harper
by
D. S. Holloway & Co
his Attys.

United States Patent Office.

CHARLES A. HARPER, OF RAHWAY, NEW JERSEY.

*Letters Patent No.* 66,329, *dated July* 2, 1867; *antedated June* 24, 1867; *reissue No.* 2,806, *dated November* 26, 1867.

WATER-BOILER.

The Schedule referred to in these Letters Patent and making part of the same.

TO ALL WHOM IT MAY CONCERN:

Be it known that I, CHARLES A. HARPER, of Rahway, in the county of Union, and State of New Jersey, have invented a new and useful Improvement in Boilers for Heating Water; and I do hereby declare that the following is a full, clear, and exact description of the same, reference being had to the annexed drawings, making part of this specification, in which—

Figure 1 is a perspective view, and

Figure 2 is a vertical section.

The same letters are employed when referring to identical parts.

A is a boiler, of any convenient form or desired size. The water contained in this boiler may be heated by gas, coal, or in any other convenient manner. B is a cylindrical recess in the body of the boiler A, through which the heat, with the unconsumed products of combustion, passes into and escapes through the pipe E, rising through the boiler. The water in the boiler surrounds the recess B and pipe E, increasing to this extent the fire-surface. Within the recess is placed the pipe-formed or annular water-chamber C, which is not connected with the shell of the boiler, except by the pipes D and D′, the former placed at or near the top, and the latter placed at or near the bottom. The heat from the fire surrounds and is in contact with all of the external surface of the chamber C. B′ is a pipe, formed through the annular chamber C, with a small opening at the top, so that part of the draught shall be through this pipe B′, and part through the space between the annular chamber C and the shell of the boiler forming the recess B. On account of its greater fire-surface, as compared with the amount of water contained, the water will heat far more rapidly in the heater C than it will in the body of the boiler A. The heated water in the heater C, being specifically lighter than that contained in the boiler, will rise, passing through the pipe D, and to supply its place a current of water will flow into the heater below, through the pipe D′. By this means a rapid circulation will be established through the heater, and the heat thus acquired, being diffused through the boiler A, will rapidly elevate its temperature.

I do not claim to have been the first to make use of this principle of circulation, but only the means by which it is produced.

What I claim as my invention, and desire to secure by Letters Patent, is—

In combination with a boiler, A, an anular water-chamber, C, connected therewith by pipes D D′, and so constructed and arranged that the heat shall be applied entirely around the latter, and the water circulate through the same, substantially in the manner set forth.

In testimony whereof I have signed my name to this specification in the presence of two subscribing witnesses.

C. A. HARPER.

Witnesses:

J. R. BALDWIN,

ALBERT E. BROWN